(12) United States Patent
Allen et al.

(10) Patent No.: US 9,710,300 B2
(45) Date of Patent: *Jul. 18, 2017

(54) FLOW TOPOLOGY OF COMPUTER TRANSACTIONS

(71) Applicant: International Business Machines Corporation, Armonk, NY (US)

(72) Inventors: Gerald M. W. Allen, Eastleigh (GB); Christopher J. Baker, Eastleigh (GB); Dennis L. Plum, Bishop's Stortford (GB); Philip I. Wakelin, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,241

(22) Filed: Jun. 7, 2016

(65) Prior Publication Data

US 2016/0283266 A1    Sep. 29, 2016

Related U.S. Application Data

(63) Continuation of application No. 13/416,987, filed on Mar. 9, 2012, now Pat. No. 9,405,576, which is a
(Continued)

(51) Int. Cl.
  *G06F 9/48* (2006.01)
  *G06F 15/173* (2006.01)
  *G06F 9/46* (2006.01)

(52) U.S. Cl.
  CPC ............ *G06F 9/4843* (2013.01); *G06F 9/466* (2013.01)

(58) Field of Classification Search
  CPC ......... H04L 41/12; H04L 67/10; H04L 43/12; H04L 45/02; H04L 43/04; H04L 43/0876;
  (Continued)

(56) References Cited

U.S. PATENT DOCUMENTS 5,819,089 A * 10/1998 White ...................... G06F 8/38
                                                                 718/106
6,286,129 B1 * 9/2001 Agarwal ................... G06F 8/34
                                                                 715/764

(Continued)

FOREIGN PATENT DOCUMENTS

WO          03010679 A1    2/2003

OTHER PUBLICATIONS

U.S. Appl. No. 13/230,966 Non-Final Office Action Mailed May 22, 2013.
(Continued)

*Primary Examiner* — Sargon Nano
(74) *Attorney, Agent, or Firm* — Law Office of Jim Boice

(57) ABSTRACT

A computer implemented method generates a visualization of a topology of a flow of multiple transactions. One or more processors detect that a first computer system has received a current transaction initiation request from a precursory transaction. The current transaction initiation request is for an initiation of a current transaction in a computer system, and contains parameter information that is recorded by each computer in a set of interconnected computer systems on which a transaction in the other precursory transactions is executed. One or more processors identify the flow of multiple transactions based on a flow transaction identifier and an identifier of the current transaction in the computer system. The one or more processors generate a visualization of a topology map of the current transaction and the other transactions based on information in the parameter information from the current transaction initiation request.

6 Claims, 3 Drawing Sheets

Related U.S. Application Data continuation of application No. 13/230,966, filed on Sep. 13, 2011, now abandoned.

(58) Field of Classification Search
CPC ..... H04L 45/00; H04L 47/70; H04L 61/1511; H04L 29/12066; H04L 41/0213; H04L 41/0893; H04L 41/0896; G06F 9/5061
See application file for complete search history.

(56) References Cited

U.S. PATENT DOCUMENTS

| | | | |
|---|---|---|---|
| 6,885,641 | B1 | 4/2005 | Chan et al. |
| 7,080,144 | B2 | 7/2006 | Boehmke |
| 7,197,559 | B2 | 3/2007 | Goldstein et al. |
| 7,734,775 | B2 | 6/2010 | Barnett et al. |
| 7,856,482 | B2 | 12/2010 | Johnson |
| 7,881,440 | B2 | 2/2011 | Castillo et al. |
| 8,180,872 | B1 | 5/2012 | Marinelli et al. |
| 8,285,704 | B2 | 10/2012 | Waters et al. |
| 8,301,593 | B2 | 10/2012 | Hoffmann et al. |
| 8,312,419 | B2 | 11/2012 | Wilcock et al. |
| 8,336,040 | B2 | 12/2012 | Davidson et al. |
| 8,346,931 | B2 | 1/2013 | Bobak et al. |
| 8,428,983 | B2 | 4/2013 | Bobak et al. |
| 8,791,948 | B2 | 7/2014 | Patil et al. |
| 2002/0065942 | A1* | 5/2002 | Niwa ................ H04L 12/40091 709/249 |
| 2003/0014464 | A1 | 1/2003 | Deverill et al. |
| 2004/0220947 | A1 | 11/2004 | Aman et al. |
| 2005/0018611 | A1 | 1/2005 | Chan et al. |
| 2005/0088976 | A1 | 4/2005 | Chafle et al. |
| 2005/0226265 | A1* | 10/2005 | Takatori ............. H04Q 11/0478 370/452 |
| 2005/0228852 | A1 | 10/2005 | Santos et al. |
| 2005/0251371 | A1 | 11/2005 | Chagoly et al. |
| 2007/0268844 | A1 | 11/2007 | Elko et al. |
| 2008/0126693 | A1 | 5/2008 | Cometto et al. |
| 2008/0195673 | A1 | 8/2008 | Hamel et al. |
| 2008/0288811 | A1 | 11/2008 | Sudhakar |
| 2009/0144409 | A1 | 6/2009 | Dickerson et al. |
| 2009/0189777 | A1* | 7/2009 | Johnson ................ E21B 47/12 340/853.7 |
| 2009/0190484 | A1 | 7/2009 | Johnson et al. |
| 2009/0313311 | A1 | 12/2009 | Hoffmann et al. |
| 2010/0042745 | A1 | 2/2010 | Maeda et al. |
| 2010/0191884 | A1 | 7/2010 | Holenstein et al. |
| 2010/0281178 | A1 | 11/2010 | Sullivan |
| 2010/0296411 | A1 | 11/2010 | Chambers |
| 2011/0170402 | A1* | 7/2011 | Kikuchi ................. H04L 41/12 370/216 |
| 2011/0228705 | A1* | 9/2011 | Aguirre ................ H04L 45/122 370/254 |
| 2011/0270972 | A1 | 11/2011 | Mukherjee et al. |
| 2013/0067074 | A1* | 3/2013 | Allen ..................... G06F 9/466 709/224 |
| 2014/0215058 | A1* | 7/2014 | Vicat-Blanc .......... H04L 43/045 709/224 |
| 2015/0288569 | A1* | 10/2015 | Agarwal ............. H04L 41/0879 709/224 |

OTHER PUBLICATIONS

U.S. Appl. No. 13/416,987 Non-Final Office Action Mailed May 12, 2015.
U.S. Appl. No. 13/416,987 Final Office Action Mailed Sep. 30, 2015.
T. Shirai et al, "A Fast Topology Inference—A Building Block for Network-Aware Parallel Processing", HPDC'07, Proceedings of the 16th International Symposium on High Performance Distributed Computing, ACM, New York, NY, 2007, pp. 11-21.
A. Hagin et al, "Distributed Multimedia Application Configuration Management", Parallel and Distributed Systems, IEEE Transactions On, vol. 11, Issue 7, Jul. 2000, pp. 669-682.
R. Edelman et al, "Debugging SOC Designs With Transactions", Mentor Graphics, San Jose, CA, USA, pp. 1-12.
D.A.Rawsthorne, "Capturing Functional Requirements Through Object Interactions", Requirements Engineering, 1996, Proceedings of the Second International Conference On, Apr. 15-18, 1996, pp. 60.
IBM, "An Approach to Construct the Topology Diagram for Asynchronized Transactions in SOA System", March 24, 2009, www.ip.com, http://www.ip.com, http://www.ip.com/pubview/IPCOM000181021D, pp. 1-6.

* cited by examiner

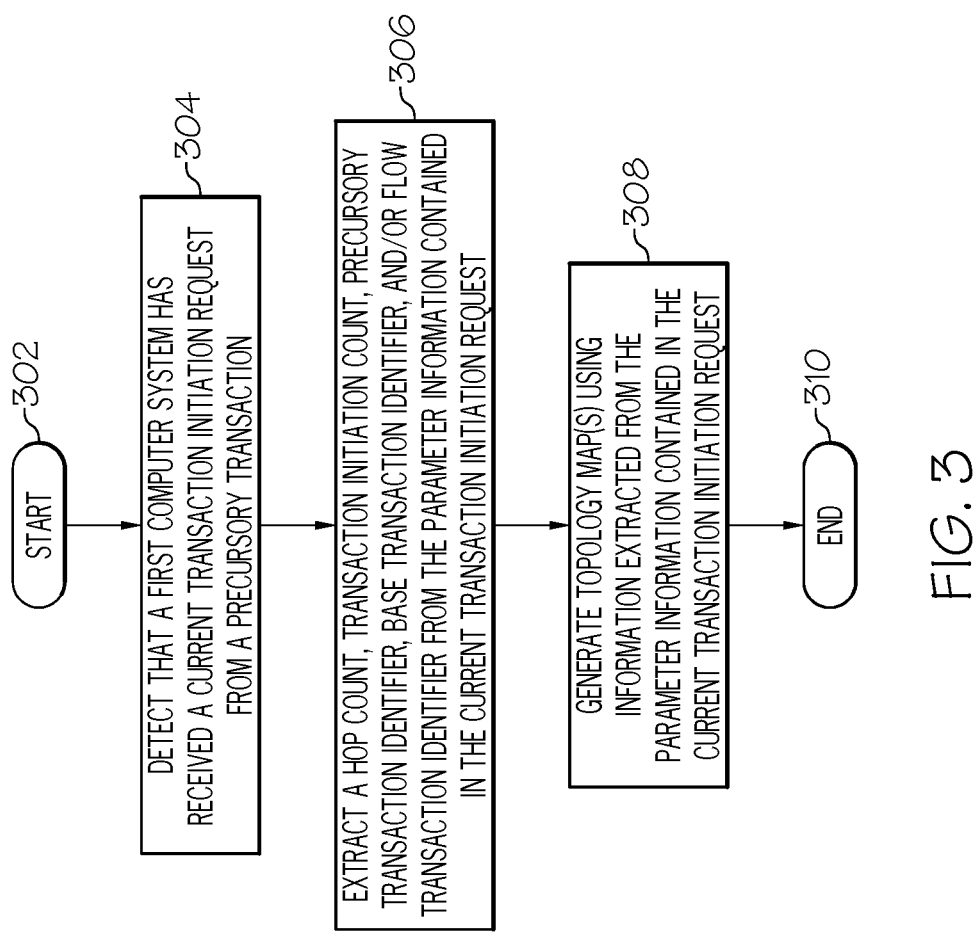

FLOW TOPOLOGY OF COMPUTER TRANSACTIONS

The present application is a continuation of U.S. patent application Ser. No. 13/416,987, filed on Mar. 9, 2012, and entitled, "Flow Topology of Computer Transactions," which is incorporated herein by reference.

BACKGROUND

The present disclosure relates to the field of computers, and specifically to computer transactions that are executed by computers. Still more particularly, the present disclosure relates to generating and representing a flow topology of computer transactions.

A transaction, also called a computer transaction, is defined as the execution of a sequence of computer instructions in the form of one or more computer programs. A first transaction can cause another transaction to initiate/execute. This other transaction may be called to execute in a same or different computer system as the first transaction.

SUMMARY

A computer implemented method generates a visualization of a topology of a flow of multiple transactions. One or more processors detect that a first computer system has received a current transaction initiation request from a precursory transaction. This detection that the first computer system has received the current transaction initiation request from the precursory transaction is performed by a monitoring computer. The current transaction initiation request is for an initiation of a current transaction in the first computer system, the precursory transaction is part of a flow of other transactions that are upstream from the current transaction and that are initiated by a set of interconnected computer systems, and the current transaction initiation request contains parameter information that is recorded by each computer in the set of interconnected computer systems on which a transaction in the other transactions is executed. The parameter information comprises: a flow transaction identifier that identifies all transactions in the flow of other transactions that are upstream from the current transaction; a hop count that identifies how many computer systems have received other transaction initiation requests in the flow of other transactions; and a transaction initiation count that identifies how many transaction initiation requests have been transmitted in the flow of other transactions within each of the interconnected computer systems. One or more processors identify the flow of multiple transactions based on the flow transaction identifier and an identifier of the current transaction in the first computer system. The one or more processors generate a visualization of a topology map of the current transaction and the other transactions based on information in the parameter information from the current transaction initiation request.

BRIEF DESCRIPTION OF THE DRAWINGS

FIG. 3 is a high level flow chart of one or more exemplary steps taken by a computer to generate a visualization of a topology of a flow of multiple transactions.

DETAILED DESCRIPTION

Figure 1:
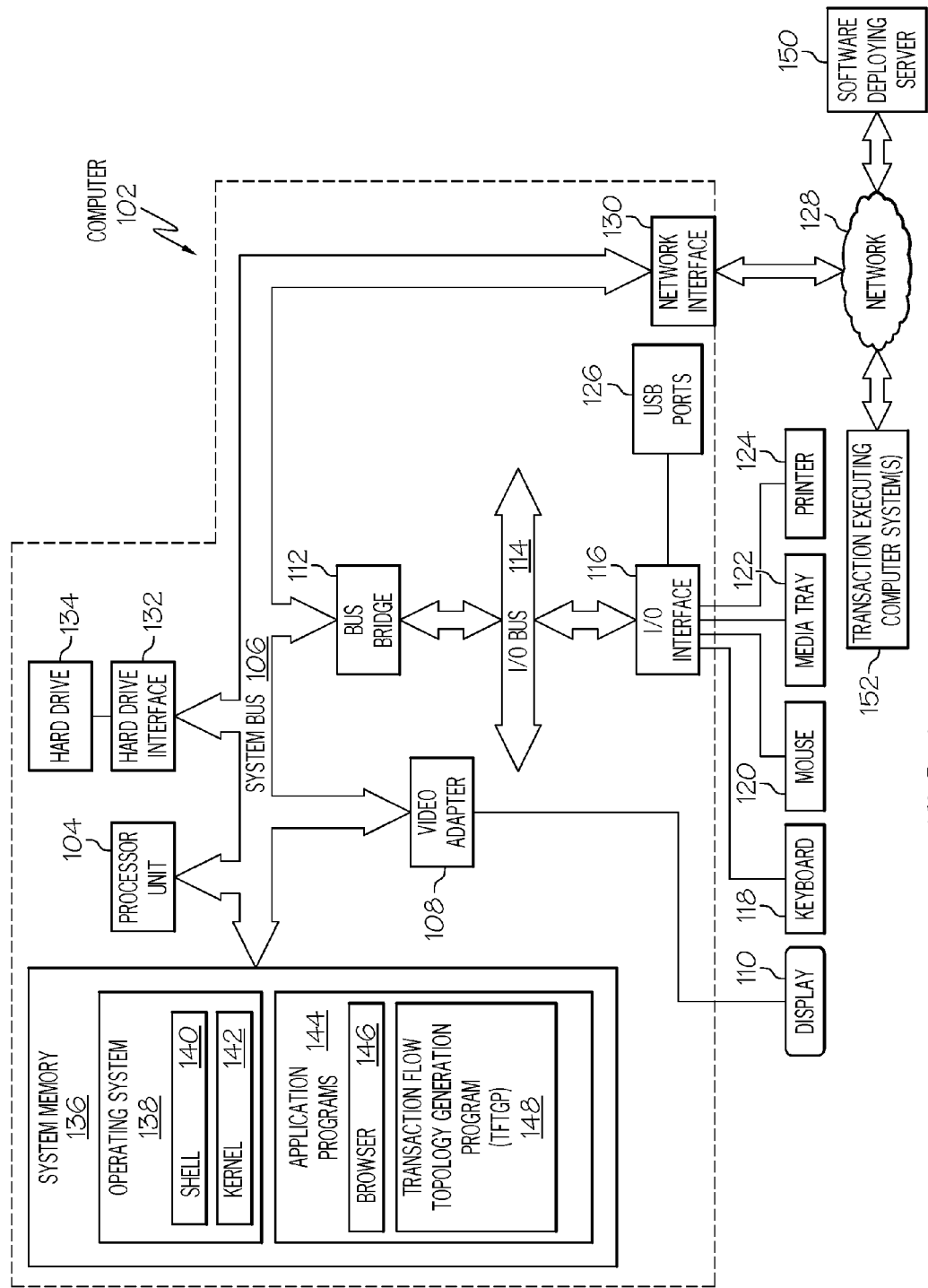
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, and/or transaction execution computer system(s) 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or transaction executing computer system(s) 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a transaction flow topology generation program (TFTGP) 148. TFTGP 148 includes code for implementing the processes described below, including those described in FIGS. 2-3. In one embodiment, computer 102 is able to download TFTGP 148 from software deploying server 150, including in an on-demand basis, such that the code from TFTGP 148 is not downloaded until runtime or otherwise immediately needed by computer 102. Note further that, in one embodiment of the present disclosure, software deploying server 150 performs all of the functions associated with the present disclosure (including execution of TFTGP 148), thus freeing computer 102 from having to use its own internal computing resources to execute TFTGP 148.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

In one embodiment, the present disclosure is related to a set of related transactions that are initiated in a set of interconnected computer systems. For the purposes of this disclosure, a transaction is defined as the execution of a sequence of computer instructions in the form of one or more computer programs. In one embodiment, these transactions do not have any ability to recover from or correct a failure that may occur during their execution.

In one embodiment, one or more transactions in the set of related transactions execute in the same computer system as another transaction in the set. In this or other embodiments, some or all of the transactions in the set of related transactions execute in different computer systems. Whether a computer system is "different" from another computer system is based on any of several predefined criteria, including, but not limited to, 1) being in separate rooms, buildings, cities, countries, etc.; 2) running on different operating systems; 3) being contained within different housings/blade chasses/etc.; 4) using different types of processors; etc. Two computer systems that are the "same" will have the converse descriptors/criteria/features as "different" computer systems.

In one embodiment, since transactions may run in the same or different computer systems, there is no one-to-one correlation between transactions in the set and the interconnected computer systems.

In accordance with the environmental conditions of the present disclosure, a first transaction in the set of transactions initiates one or more subsequent transactions, each of which may itself initiate further transactions and so on until the final transaction executes. The final transaction to execute is characterized by not initiating any other transaction. Transactions in the set may or may not execute for the same duration of time.

Once the first transaction has begun to execute, other transactions that are initiated by it or subsequent transactions in the set may terminate at any time. That is, the first transaction in the set can terminate before other transactions in the set of transactions do so. Alternatively, the first transaction and other "downstream" transactions in the set of transactions may terminate simultaneously. A further characteristic of the set of transactions is that any transaction in the set of transactions can execute in parallel with any other transaction in the set of transactions regardless of whether or not they execute on the same computer system.

In one embodiment of the present disclosure, a set of transactions does not conform to a single tree structure, since the set of transactions as a whole changes state over time. The set of transactions may have a different tree structure at a number of times during the period it exists.

For the purposes of this disclosure the term "flow topology" is defined as a set of tree structures that exist with the set of transactions during the period it exists. Each transaction in the set has parameter information associated with it. This parameter information is recorded by the computer system on which the transaction executes. In one embodiment, once generated, the flow topology contains identification information concerning the computer system which executed the first transaction in the set. In one embodiment, the flow topology also contains identification information concerning each transaction itself, including start time and identification of the computer system on which it executes. Finally, in one embodiment the flow topology also contains a unique identifier which is the same for all transactions in the set and which identifies the set of transactions itself.

In accordance with the present invention, each time a transaction issues a transaction initiation request for another transaction to initiate, that transaction initiation request includes parameter information. This parameter information, which was produced by the requesting transaction that sent the transaction initiation request, includes several items of data.

First, the parameter information includes identification data that identifies the previous transaction in the set which caused the particular transaction concerned to be initiated. This previous transaction may or may not have executed on a different computer system as the computer system to which the request was sent. All transactions in the set have a value for this identification data except for the first transaction (i.e., the "base" transaction) in the set of transactions. That is, consider the set of transactions 200 shown in FIG. 2. The parameter information in each transaction initiation request will contain an identifier of one or more upstream transactions. The term "upstream" is defined as describing any transaction that directly, or through an intermediary transaction indirectly, sent a transaction initiation request to a current transaction. For example, consider transaction 1 in computer system A (202). Transaction 1 sends a first transaction initiation request to transaction 2 (a "current transaction" that is in the process of executing) in computer system B (204), requesting that transaction 2 execute. Note that there may or may not be a dependency between transaction 1 and transaction 2 (e.g., transaction 1 may or may not require the output of transaction 2 in order to proceed), and thus a transaction initiation request may or may not be a "call", "interrupt", or similar procedure. As noted above, transaction 1 does not have any identification data that describes "upstream" transaction initiation requests and/or computer systems that were used by "upstream" transactions, since transaction 1 is the base transaction (having no precursory transactions/systems) in the flow of transactions depicted in FIG. 2.

Figure 2:
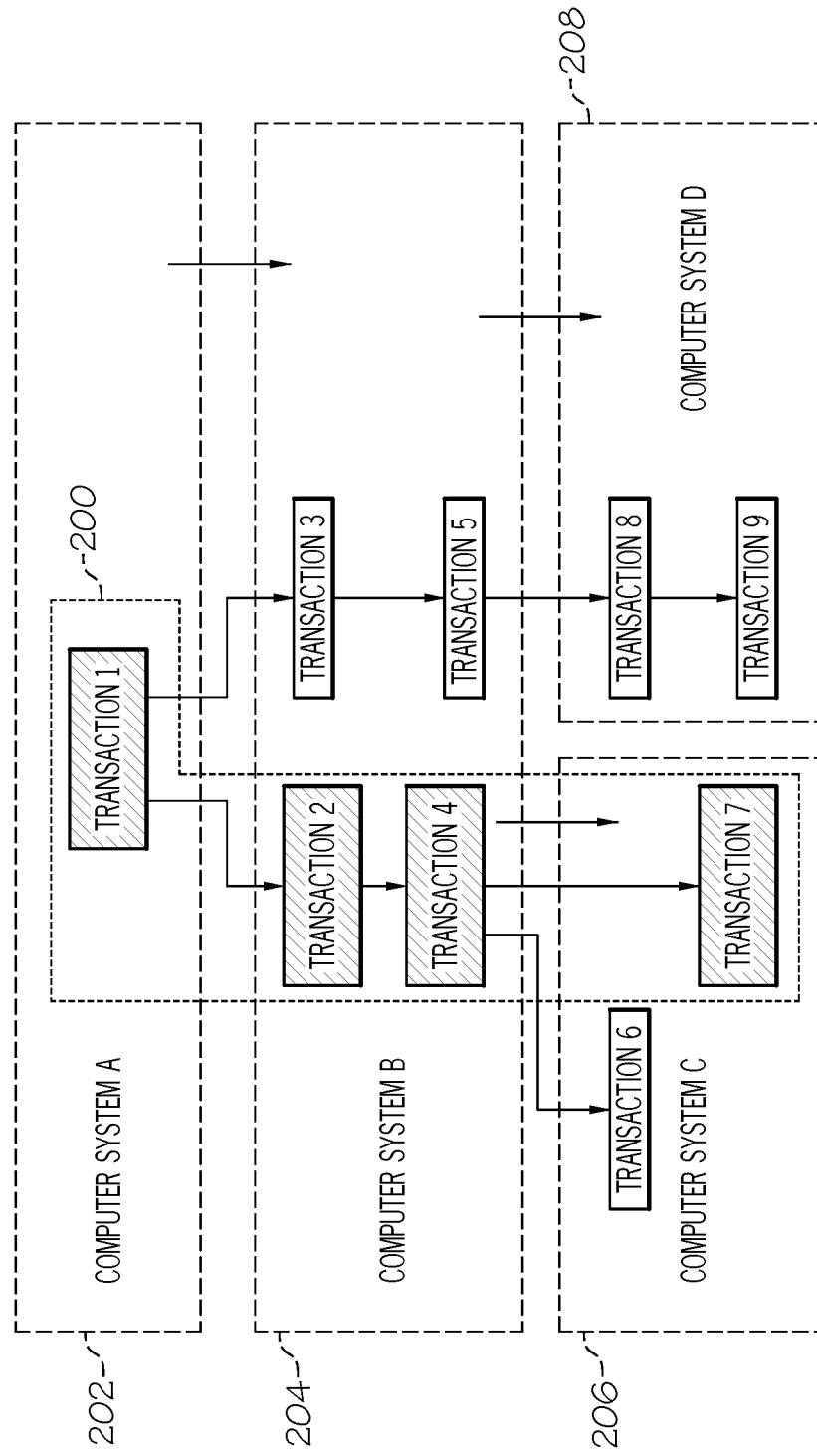
FIG. 2 illustrates an exemplary topological flow map of transactions being initiated in various computer systems.

Continuing with the example shown in FIG. 2, transaction 2 may then send a subsequent transaction initiation request to transaction 4, which sent the current (i.e., most recent) transaction initiation request to transaction 7 in computer system C (206). Thus, in one embodiment, contained within each of the transaction initiation requests are identifiers of each immediately precursory transaction (i.e., transaction 4 from the viewpoint of transaction 7), the base transaction (i.e., transaction 1), and/or all transactions in the flow of the set of transactions 200 (i.e., transactions 1, 2, 4) that are upstream from the current transaction 7 (i.e., the "current transaction" that is currently executing). Thus, the "base transaction" is defined as a transaction that initiated the flow of other transactions through transaction initiation requests. In the example shown in FIG. 2, transaction 1 is depicted as the base transaction in the flow of transactions. In one embodiment, the term "base transaction" is further defined to limit the base transaction to a transaction that was never called to enactment by an upstream transaction initiation request (as shown for transaction 1). In another embodiment, the term "base transaction" includes any upstream transaction in the flow of transactions (e.g., transaction 2 would be referred to as a "base transaction" with respect to transaction 4 and/or transaction 7).

This first extension to the parameter information allows a computer system for a computer operator to make visible a sequence of transactions in the set. This sequence of transactions begins with the first transaction 1 in the set of transactions 200 and includes a subset of transactions 2, 4 in the set of transactions 200 that are related as a consequence of a sequence of transaction initiation requests made by one transaction to initiate another. In the example depicted in FIG. 2, transactions 1, 2, 4, and 7 are a subset of the complete set of transactions 1 to 9. In addition, transactions 1, 2, 4, and 7 are related in that they exist as a consequence of a sequence of transaction initiation requests, thus making them part of the set of transactions 200. Note that transactions 3, 5, 6, 8, and 9, although they have a lineage that goes back to transaction 1, are not part of the set of transactions 200. Nonetheless, each transaction initiation request that is sent to transactions 3, 5, 6, 8, and 9 will include parameter information analogous to that described above for the set of transactions 200.

Second, the parameter information which is recorded for a transaction in the set is extended to include a "hop count," which is defined to mean "the number of times there has been a transmission of a transaction initiation request from one computer system to another computer system, starting from the computer system in use by the first transaction in the set". With reference again to FIG. 2, transaction 1 has a hop count of zero, transactions 2 and 4 have a hop count of one, and transaction 7 has a hop count of two. With respect to a subset of transactions in the set which are related by being initiated in a linear sequence in a number of computer systems (i.e., set of transactions 200), each transaction will have a non-zero hop count value except the first transaction in the subset. This allows a computer system for a computer operator to make visible a sequence of computer systems which begins with the computer system which executed the first transaction in the set. As shown in FIG. 2, the sequence of computer systems is A (202), B (204) and C (206) for the sequence of transactions 1, 2, 4 and 7. Note that computer system D (208) is not part of this sequence.

Third, the parameter information that is recorded for a transaction in the set of transactions is extended to include a "transaction initiation count", which is defined to mean "the number of times there has been a transaction initiation request within a subset of transactions within a computer system". The transaction initiation count allows a computer system used by a computer operator to make visible a subset of transactions which execute on the same computer system. This subset of transactions in the set of transactions is restricted to transactions which execute as a result of a sequence of transaction initiation requests made by transactions in the subset and which are executed by the particular computer system. With reference to FIG. 2, in computer system B (204), transaction 2 has a transaction initiation count of zero and transaction 4 has a transaction initiation count of one.

Referring now to FIG. 3, a high level flow chart of one or more exemplary steps taken by a processor to generate a visualization of a topology of a flow of multiple transactions is presented. After initiator block 302, a processor detects that a first computer system has received a current transaction initiation request from a precursory transaction (block 304). For example, a processor may detect that the transaction 7 in FIG. 2 has received a transaction initiation request from transaction 4, requesting that transaction 7 begins executing. Note that this detection may be made by a processor in any of the computer systems 202, 204, 206, or 208 shown in FIG. 2. In one embodiment, however, computer systems 202, 204, 206, or 208 are analogous to the transaction executing computer system(s) 152 shown in FIG. 1, such that their activities are monitored by computer 102. Thus, processor 104 may be the unit that detects that a first computer system (e.g., computer system 206 in FIG. 2) has received the current transaction initiation request for transaction 7 to being executing.

As described herein, wherein the current transaction initiation request is for an initiation of a current transaction (e.g., transaction 7) in a computer system (e.g., computer system C—206), such that the precursory transaction (e.g., transaction 4 shown in FIG. 2) is part of a flow of other transactions (e.g., to include transactions 2 and 1 as shown in FIG. 2) that are upstream from the current transaction. The term upstream describes both the precursory transaction (e.g., transaction 4 in FIG. 2) that issued the current transaction initiation request to transaction 7 as well as transactions 2 and 1 that issued earlier transaction initiation requests.

Note that the current transaction initiation request contains parameter information. As described herein, this parameter information includes, but is not limited to, a hop count that identifies how many computer systems have received other transaction initiation requests in the flow of other transactions in the set of transactions; a transaction initiation count that identifies how many transaction initiation requests that have been transmitted in the flow of other transactions in the set of transactions; a precursory transaction identifier that identifies the precursory transaction (e.g., the immediately preceding transaction in the set of transactions; a base transaction identifier that identifies a base transaction in the flow of other transactions in the set of transactions; and/or a flow transaction identifier that identifies all transactions in the flow of other transactions in the set of transactions).

As described in block 306, some or all the parameter information is extracted from the current transaction initiation request. As described in block 308, this parameter information is used to generate a topology map of the flow of set transactions (e.g., present a display of the topology map in a display such as display 110 shown in FIG. 1). In one embodiment, only the hop count and the transaction initiation count are extracted from the parameter information. This enables a rapid generation of a visualization (e.g., displayed) of a topology map of the current transaction and other transactions in the set of transactions. That is, by using only the hop count and the transaction initiation count, a topology map can be quickly generated showing how many transactions and how many computer systems were used such that the current transaction initiation request is sent to the current transaction in the first computer system. More specifically, by having only the hop count and the transaction initiation count, the topology map for the set of transactions 200 shown in FIG. 2 can be generated, even though the identities of the computer systems and the identities of the upstream transactions are not given by the hop count and the transaction initiation count alone. Nonetheless, such a map provides a quick view of what resources/computer systems/transactions are being used by any and all transactions in a set of transactions. However, if a user desires to know what transactions are part of the set of transactions in the flow, then each precursory transaction can add its identifier to the parameter information in the transaction initiation request. These identifiers can be grouped into a flow transaction identifier that identifies all transactions in the flow. In one embodiment, the base transaction identifies itself with a special notation, indicating that it is the first transaction (e.g., transaction 1 shown in the set of transactions 200 in FIG. 2) in the set of transactions. By using this identification information, the topology map can be modified to identify one or more of the transactions in the flow of the set of transactions. Similarly, each transaction initiation request can contain a computer system identifier, which identifies which particular computer system initiated a particular transaction. For example, the computer system identifier would identify computer system B (204) as the computer system that initiated transactions 2 and 4. This information is thus used to modify the topology flow representation/map to provide this addition detail about the flow of the set of transactions.

Returning to block 308, multiple topology maps of the flow of the set of transactions can be generated and presented in a visualization over a passage of time. Thus, if the topology maps change in appearance, a controller can determine that the current transaction (e.g., transaction 7 in FIG. 2) is being called by a different set of transactions and/or through a different set of computer systems. For example, assume that a new flow shows that transaction 7 was initiated directly from transaction 1. As such, computer system B (204) is no longer part of the process.

Similarly, assume that a new flow shows that transaction 7 was initiated by transaction 8. As such, a new computer system (computer system D—208) is now part of the topology map for transaction 7. Furthermore, in this new flow, transactions 2 and 4 are replaced by transactions 3 and 5 in the topology flow map. This provides the operator with additional information about which resources/transactions are using transaction 7.

In one embodiment, the transaction initiation count described above further describes how many transaction initiation requests have been processed in a particular computer system. For example, in FIG. 2, computer system B (204) was used by both transaction 2 and transaction 4. By extracting this data from the transaction initiation count, the topology map can be further refined/modified to show how many transaction initiation requests have been processed in a particular computer system.

Note that the present invention presents a novel and useful improvement over the prior art for several reasons. For example, with identification information recorded in flows in the past, it is not possible for the control operator to make a coherent visualization of the flow between the set of transactions. There is no identification information recorded for a transaction in the set which shows which other transaction caused it to be started and its relative position in the set from the first transaction. Therefore the flow topology of a set of computer transactions cannot easily be made visible unless additional initiation timing information is captured for each transaction in the set. Even with such timing information it is still problematic to calculate the flow topology when there are multiple transactions initiated at each step.

The present invention, however, provides a processor with the ability to calculate the flow topology of a set of related transactions that are initiated in interconnected computer systems. Additional identification data is recorded for each transaction in the set. This records information detailing which transaction in the set was responsible for causing initiation of the current transaction, and counters detailing the relative position in the set from the first transaction and its computer system. This allows a computer system for a computer operator to make visible the flow topology of the set of transactions and for the computer operator to more easily determine the relationships between transactions in the set when presented with the identification data for any given transaction in the set.

As described herein, the overall effect of the additional parameter information being recorded for each transaction in the set is that the computer system for the control operator is able to determine and present a visualization of the topology of transactions in the set in terms of related transactions and the computer systems on which they each execute. For any particular transaction in the set, the computer system for the operator can easily determine the transaction which initiated it, and whether this transaction executed on the same computer system or on a different computer system. Visualization of such an initiating transaction could be in the form of a visualization in a sequence of transactions. In addition, a historical visualization of flow topology can be presented by the computer system for the control operator. For the purposes of this disclosure, historical visualization of flow topology refers to repeated presentation of such topology of transactions and their parameter information. This repeated presentation in numerical or graphical form of the set of all, or a subset, of transactions together with their parameter information allows visualization of how the topology of such transactions changes over time.

Note further that the topology information is all found within the transaction initiation requests described herein. Thus, the topology map can be generated directly from any transaction initiation request within a flow, without having to search/mine a database in another location, map to the appropriate sets of transactions, etc., thus providing another useful benefit over the prior art that has to use such lookup techniques.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of identifying details of a flow of multiple transactions and generating a visualization of a topology of the flow of multiple transactions, the method comprising:
   detecting, by one or more processors, that a first computer system has received a current transaction initiation request from a precursory transaction, wherein detecting that the first computer system has received the current transaction initiation request from the precursory transaction is performed by a monitoring computer; wherein the current transaction initiation request is for an initiation of a current transaction in the first computer system, wherein the precursory transaction is part of a flow of other transactions that are upstream from the current transaction and that are initiated by a set of interconnected computer systems, wherein the current transaction initiation request contains parameter information that is recorded by each computer in the set of interconnected computer systems on which a transaction in the other transactions is executed, and wherein the parameter information comprises:
      a flow transaction identifier that identifies all transactions in the flow of other transactions that are upstream from the current transaction;
      a hop count that identifies how many computer systems have received other transaction initiation requests in the flow of other transactions, and
      a transaction initiation count that identifies how many transaction initiation requests have been transmitted in the flow of other transactions within each of the interconnected computer systems;
   identifying, by one or more processors, the flow of multiple transactions based on the flow transaction identifier and an identifier of the current transaction in the first computer system; and
   generating, by one or more processors, a visualization of a topology map of the current transaction and the other transactions based on information in the parameter information from the current transaction initiation request.

2. The method of claim 1, wherein the parameter information further comprises a precursory transaction identifier that identifies the precursory transaction, and wherein the method further comprises:
   extracting, by one or more processors, the precursory transaction identifier from the parameter information; and
   modifying, by one or more processors, the topology map based on the precursory transaction identifier.

3. The method of claim 1, wherein the parameter information further comprises a base transaction identifier that identifies a base transaction in the flow of other transactions, wherein the base transaction initiated the flow of other transactions, and wherein the method further comprises:
   extracting, by one or more processors, the base transaction identifier from the parameter information; and
   modifying, by one or more processors, the topology map based on the base transaction identifier.

4. The method of claim 1, further comprising:
   generating, by one or more processors, multiple topology maps of the current transaction and the other transactions over a passage of time; and
   presenting, by one or more processors, an historical visualization of the multiple topology maps in order to represent changes to transaction initiation requests from the flow of other transactions to the current transaction.

5. The method of claim 1, further comprising:
   generating, by one or more processors, multiple topology maps of the current transaction and the other transactions over a passage of time; and
   presenting, by one or more processors, an historical visualization of the multiple topology maps in order to represent a change as to which computer systems received the transaction initiation requests from the flow of other transactions to the current transaction.

6. The method of claim 1, wherein the transaction initiation count further describes how many transaction initiation requests have been processed in a particular computer system used in an execution of the current transaction and the other transactions, and wherein the method further comprises:
   extracting, by one or more processors, data from the transaction initiation count that describes how many transaction initiation requests have been processed in the particular computer system used in the execution of the current transaction and the other transactions; and
   modifying, by one or more processors, the topology map based on the data from the transaction initiation count that describes how many transaction initiation requests have been processed in the particular computer system used in the execution of the current transaction and the other transactions.

* * * * *